UNITED STATES PATENT OFFICE.

JOSEPH BELL, OF BROOKLYN, NEW YORK.

PROCESS OF REVIVIFYING GAS-LIME.

SPECIFICATION forming part of Letters Patent No. 406,192, dated July 2, 1889.

Application filed December 3, 1888. Serial No. 292,548. (No specimens.)

*To all whom it may concern:*

Be it known that I, JOSEPH BELL, a citizen of the United States, residing at Brooklyn, in the county of Kings, State of New York, have invented certain new and useful Improvements in the Process of Revivifying Gas-Lime, of which the following is a specification, reference being had therein to the accompanying drawing.

The object of my invention is to revivify gas-lime without the necessity of previous treatment and molding, whereby labor is saved and further improvements made in the process, as will appear in the following specification.

In the process of the manufacture of coal-gas one step of the process requires the use of slaked lime for the purpose of removing certain ingredients deleterious to the gas as an article for sale. These ingredients are principally sulphureted hydrogen, carbon-disulphide, sulphurous acid, carbonic acid, and small quantities of mercaptans or sulphur alcohols and ammonia. The impregnation of the slaked lime with these ingredients produces a very foul product, which it has been for some time a desirable object to purify without nuisance to the neighborhood, in order that the lime may be used again for the purpose of purifying a further quantity of gas. The best method for this purpose has been found to be heating the gas-lime and converting it back to quicklime, which only requires to be wet to be again in condition for use in the purifying-chambers. The powdery nature of the gas-lime has made it necessary to mold it hitherto in the shape of bricks in order to allow of the proper action of the flames of the kiln upon it.

My improvement consists in doing away with all this labor of molding and introducing a further ingredient with the gas-lime, which shall accomplish the object hitherto only attained by such molding. In the selection of such further substance the object to be attained is not only to change the powdery state of the material to be acted upon, but also to provide a substance which should aid chemically in the revivifying of the lime. Such effects I have found can be attained by the admixture of freshly-slaked lime to the old lime.

My process is conducted as follows: I first mix the fresh lime with the old in order to bring the whole to a proper consistency. I then mix in the proper amount of coal-dust or other carbonaceous fuel with the mass and introduce this mixture into the kilns by the shovelful. The fuel burns in the very body of the mass and acts to drive out the acid radicals in combination with the calcium. The process is carried on in the presence of a sufficient quantity of air to prevent a retarding reducing action of the fuel, and the lime is reduced to the caustic state again. Since the fire is in the midst of the mass held together by the influence of the slaked lime, there is no necessity to mold the substance into bricks, as has hitherto been practiced. The action of the fresh lime goes beyond the simple incorporation of the mass, since it tends to the absorbing of a portion of the sulphurous compounds as they are driven out, and hence reduces the percentage of these compounds in the total mass, thus accelerating the action of the kiln, since there is a greater surface exposed in proportion to the amount of gas to be driven off.

If desired, the mixture of fresh and old lime and the fuel may be fed to the kiln in layers, instead of previously mixing, as above specified; but in either case the fuel burns in the body of the mass.

Having thus described my invention and explained its advantages, what I believe to be new, and what I therefore claim, is—

1. The herein-described process of revivifying gas-lime by incorporating it with fresh slaked lime, and burning it, substantially as described.

2. The herein-described process of revivifying gas-lime by mixing it with fresh slaked lime and fuel, and burning the whole in a furnace, substantially as described.

In testimony whereof I affix my signature in presence of two witnesses.

JOSEPH BELL.

Witnesses:
H. SUTHERLAND,
L. C. HILLS.